Oct. 21, 1952　　J. A. PIANFETTI ET AL　　2,615,048
PROCESS OF PRODUCING CHLORINATED ACETALDEHYDES UTILIZING
CHLORINATED ACETALDEHYDES AS DILUENTS
Filed Oct. 20, 1948
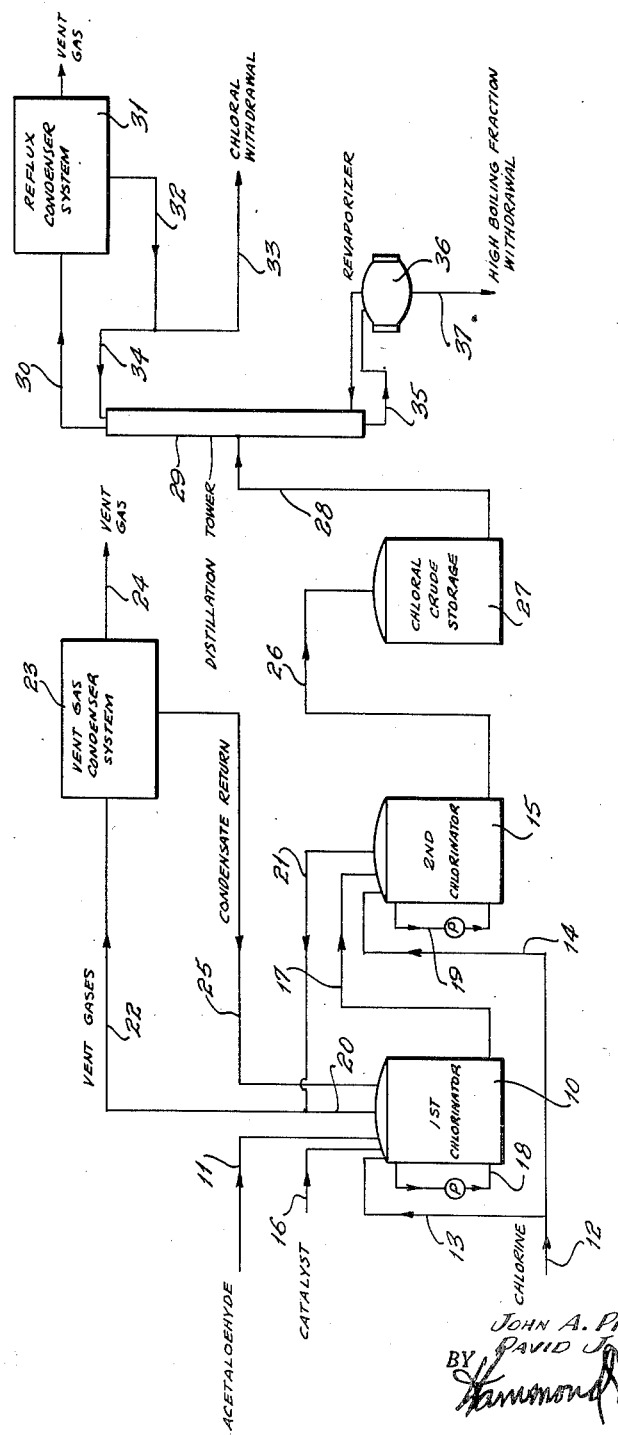
INVENTORS
JOHN A. PIANFETTI
DAVID J. PORTER
BY
*Hammond & Littell*
ATTORNEYS Patented Oct. 21, 1952

2,615,048

UNITED STATES PATENT OFFICE 2,615,048

PROCESS OF PRODUCING CHLORINATED ACETALDEHYDES UTILIZING CHLORINATED ACETALDEHYDES AS DILUENTS

John A. Pianfetti and David J. Porter, South Charleston, W. Va., assignors to Food Machinery and Chemical Corporation, New York, N. Y., a corporation of Delaware Application October 20, 1948, Serial No. 55,452

4 Claims. (Cl. 260—601)

This invention relates to the production of chlorinated acetaldehydes and, more particularly, to the production of chloral from acetaldehyde and its reversible polymers.

The demand for chloral, which is used as an intermediate in the production of DDT, namely, 2,2 - bis - (4 - chlorophenyl) - 1,1,1 - trichloroethane, has increased materially in recent years. Most of the chloral used for this and other purposes has, however, been produced from alcohol, even though a yield not exceeding about 35 per cent based upon the amount of alcohol used is obtained.

It is also known from the prior art that chloral is one of the products obtained from acetaldehyde when it is subjected to chlorination. However, acetaldehyde has not been used in the commercial production of chloral. The failure to use acetaldehyde or its reversible polymers as a raw material for the production of chloral probably is due to the fact that yields by known chlorination techniques have not been so satisfactory as those obtained by the chorination of alcohol. In general, the prior yield of chloral from acetaldehyde was too low to be commercially interesting. Apart from the unreacted aldehyde, numerous by-products which could not be converted into chloral, such as the acetyl chloride and acetic acid, or condensation products, such as butyl chloral, were produced in substantial quantities. The presence of these undesired by-products not only reduced the yield of the desired product but also introduced problems of separation.

It is a major object of this invention to provide a highly efficient process for the large scale production of chloral and other chlorinated acetaldehydes from acetaldehyde and its reversible polymers.

It is another object of this invention to provide a process for producing chloral from acetaldehyde and its reversible polymers permitting the utilization of readily available, relatively inexpensive apparatus.

It is a further object of this invention to provide a process for producing chloral from acetaldehyde and its reversible polymers at elevated temperatures making the process highly efficient without involving explosion hazards.

Yet another object of this invention is to produce chloral from acetaldehyde and its reversible polymers under conditions which preclude or inhibit polymerization of chloral.

It is a special object of this invention to produce high yields of chloral in a relatively short period of time, while minimizing the production of undesirable by-products.

Other objects and features of the invention will be obvious from the more detailed description which follows.

We have discovered that chloral can be produced from acetaldehyde and its reversible polymers which depolymerize under chlorination in commercially interesting yields in a relatively short period of time by chlorinating the aldehyde with sufficient chlorine to convert the available aldehyde into chloral without the necessity of controlling the initial chlorination temperatures and advantageously at initial chlorinating temperatures of 50° C. or more. A major proportion of the acetaldehyde or its reversible polymers is readily converted into chloral, and yields equaling or exceeding 75 per cent are normally obtained. These results are obtained by using a chloroacetaldehyde such as chloral as a diluent. The amount of diluent used varies with the apparatus and with the chlorination temperature, but customarily at least 3.5 to 4 mols of the chloroacetaldehyde should be present for every mol equivalent of acetaldehyde introduced.

In the commercial operation of the process, chlorine and acetaldehyde are added continuously to a previously chlorinated acetaldehyde, and, as a result, the amount of diluent present is far in excess of the minimum amount necessary.

Theoretically, at least 3 mols of chlorine per mol equivalent of acetaldehyde is required in the instant process to convert the acetaldehyde or its reversible polymers to chloral. However, due to the fact part of the acetaldehyde or its reversible polymers is converted into undesirable by-products utilizing less than 3 mols of chlorine and certain amounts of aldehyde are lost in the chlorination, it is difficult to specify a particular amount of chlorine to produce a satisfactory yield of a desired chlorinated product. Normally the efficient operation of the process requires that a slight excess of chlorine be used, since it is difficult to regulate the rate of flow of the chlorine gas such that all of it is consumed in the reaction and yet no unreacted aldehyde exists.

By using the chlorination product of acetaldehyde or its reversible polymers, sometimes referred to herein as a chloroacetaldehyde, problems of refining the crude product and separating undesired products are significantly reduced. When using a chlorinated aldehyde as the diluent and introducing the chlorine and aldehyde in a ratio sufficient to convert the aldehyde to chloroacetaldehyde, the concentration of the aldehyde present in the reaction mass is always maintained as low as found necessary or desirable, and conditions found conducive to the formation of the desired chlorination products are maintained and the formation of undesired by-products inhibited. When using anhydrous conditions and chlorinated acetaldehydes as diluents, ordinary metals, such as nickel, Monel metal, and the like, may be used in the reaction apparatus. In the presence of water, substantially more expensive apparatus is necessary, such as chlorinators made of a furane resin filled with asbestos and known as Haveg 60.

The reaction may be initiated at room temperatures and the temperatures permitted to rise as a result of the exothermic heat of chlorination. Where it is desired to lessen the chlorination cycle and prevent polymerization of chloral, however, chlorination is initiated at temperatures of at least 50° C. or even at 80° C. and more.

In order to obtain high yields of chloral, it is necessary to use reaction-promoting substances or other reaction-promoting techniques at least in the later stage of the process. A preferred class of reaction-promoting substances is metal chlorides, such as those of iron, zinc, antimony, tin, and chlorides of phosphorus or mixtures thereof. Antimony trichloride has proved to be especially advantageous. Generally speaking, not more than 10 per cent of the metal chlorides as compared to the weight of acetaldehyde can be used economically in the process. By using such reaction-promoters, yields of the order previously mentioned can be obtained without operating at temperatures in excess of the boiling point of the diluents used or that of the reaction mass.

Water offers a cheap reaction-promoting substance but is not preferred, since its presence apparently favors the formation of undesirable by-products and necessitates a more involved procedure for the purification of the chloral than would otherwise be necessary. When water is used as a reaction-promoter, it is customarily used in molar proportions not exceeding 1 to 3 mols per mol of acetaldehyde or its equivalent, although larger proportions may be used.

Among the other reaction-promoting techniques is chlorination at temperatures above the normal boiling point of the reaction mass.

The present process is advantageously operated by having chlorine, acetaldehyde, or its reversible polymers, and a reaction-promoting agent introduced continuously into the system and the reaction product continuously withdrawn therefrom. In such a continuous system a single reactor may be used, but it is preferable to use at least two reactors with part of the chlorine necessary to convert the aldehyde to chloral being introduced into each of the reactors. The reaction-promoting agent may be introduced into either or both of the reactors. More than two reactors may be used but generally are not necessary. When using the plurality of reactors to produce chloral, substantially all of the dichloroacetaldehyde, which is difficult to separate from the chloral, may be converted to chloral, the amount remaining being reduced to 1 per cent or less of the original aldehyde.

The process can be operated with an intermittent, rather than continuous, addition of the aldehyde. The preferred procedure for this mode of operation involves adding the aldehyde to a relatively large volume of the chlorination product, chlorinating until the desired chlorination product is reached, withdrawing enough material to reduce the content of the reactor to the same volume as that present before the addition of aldehyde, and then repeating the cycle. This intermittent technique is a type of continuous operation.

The reaction-promoter may be added in the same manner.

If the instant process is carried out continuously, there is not much danger of explosions except possibly when starting up the chlorination, since, after a steady state is reached, hydrogen chloride is evolved continuously and dilutes the chlorine-aldehyde vapors to such an extent that they are not explosive. In a special embodiment involving continuous chlorination at about 80° to 85° C. in a body of liquid consisting principally of chloral, there is no danger of explosions, even when initiating the process, since the vapor pressure of chloral is so high as to preclude the possibility of an explosive mixture of chlorine and aldehyde vapors. Likewise, where the diluent is the chlorination product of acetaldehyde or its reversible polymer, especially chlorination products containing a substantial amount of chloral, explosive mixtures are not formed. The absence of explosive conditions when operating in accordance with preferred procedures described herein constitutes a special feature of this invention.

In the operation of our process, paraldehyde is preferably used, although kindred yields can be obtained from acetaldehyde. Acetaldehyde is more difficult to handle, and the reaction is more difficult to control.

In a typical operation two connected reactors provided with agitators, vent valves, and so forth are used. The desired amount of chlorinated acetaldehyde, such as monochloroacetaldehyde, dichloroacetaldehyde, or preferably chloral, to be used as a diluent is introduced into the first reactor. The aldehyde and about 2.3 per cent of the weight thereof of antimony trichloride are introduced continuously or semicontinuously, i. e., intermittently, into the first reactor. The desired amount of chlorine is continuously introduced into the two reactors, the larger portion being introduced into the first reactor. The chlorine is introduced into the second reactor only after it has become about one-fourth filled as an overflow from the first reactor. Hydrogen chloride is evolved from each of the reactors. The rate of flow of the chlorinated material from the first reactor to the second reactor is determined by the rate of introduction of the various ingredients. The average retention time of the liquid in each chlorinator is adjusted to approximately ninety-six hours, and each reactor is maintained at a temperature of approximately 80° to 85° C. The crude chloral leaving the second chlorinator is purified by vacuum rectification. By proceeding in this manner, chloral approximating 75 per cent and higher of the theoretical yield is obtained, while less than 1 per cent of the original aldehyde remains as dichloroacetaldehyde.

We have discovered that when high yields of chloral are desired in a continuous process with most advantageous use of the apparatus, it is necessary to introduce part of the chlorine after substantially all of the acetaldehyde material has been converted into a chloroacetaldehyde. In our process we complete the chlorination in a second chlorinator, but it is apparent that such a procedure is a special embodiment of a system for introducing part of the chlorine at intermediate points along the path of flow in the system. For example, it is estimated it will take four times as long to obtain the same degree of chlorination in a single reactor or chlorinator as it takes with two reactors in series; or, saying it differently, two chlorinators in series will produce twice as much of a desired chlorinated product as two reactors of the same size in parallel.

The invention will be readily understood from a description of the practical operation of the process as applied to a preferred procedure. In the description reference will be made to the accompanying drawing wherein the apparatus and connections are diagrammatically illustrated.

Paraldehyde is continuously fed into the first chlorinator 10 through conduit 11. Simultaneously chlorine is led from a source of supply (not shown) through line 12 and thence partially through line 13 into the first chlorinator 10 and partially through line 14 into the second chlorinator 15. The chlorinators and the connecting conduits in the system do not have to be highly chemically resistant and may be made of metal such as nickel or Monel metal. Antimony chloride is continuously or intermittently introduced into the first chlorinator 10 through conduit 16. Partially chlorinated aldehyde and antimony chloride are withdrawn from the first chlorinator 10 through conduit 17 and introduced into the second chlorinator 15.

The material in the first chlorinator 10 and in the second chlorinator 15 is agitated and mixed by a circulating system generally designated by 18 and 19, respectively. If necessary, the fluid flowing through the circulating system may be provided with heating or cooling means to control the temperature of the reaction mass.

The gaseous hydrogen chloride formed in the chlorination of the paraldehyde together with certain amounts of the unchlorinated aldehyde and partially chlorinated aldehyde is withdrawn from the first chlorinator 10 through conduit 20 and from the second chlorinator 15 through conduit 21 and is thence conveyed through conduit 22 to a condenser 23. The gaseous hydrogen chloride and unused chlorine pass through the condenser and are withdrawn through conduit 24. These gaseous materials may be collected or passed into the atmosphere. The condensed aldehyde and partially chlorinated aldehyde flow back into the first chlorinator 10 through conduit 25.

The chlorinated material is withdrawn from the second chlorinator 15 through conduit 26 and introduced into storage tank 27.

When it is desired to purify the chlorinated material, it is withdrawn from tank 27 through conduit 28 and introduced into a vacuum distillation tower 29. Distillation customarily takes place at temperatures of the order of 100° C. and under a pressure of approximately 100 to 120 millimeters of mercury. The lower boiling fractions from the distillation tower 29 pass through conduit 30 to a condensing system 31, where the vapors are liquefied. The liquids flow through conduit 32, where part, constituting the chlorinated product, is withdrawn through conduit 33 and the remainder reintroduced into tower 29 through conduit 34. The impurities, such as butyl chloral and other high boiling fractions, flow from the bottom of tower 29 through conduit 35 into heater 36 and may be withdrawn therefrom through conduit 37.

In such a system yields of chloral of high purity equaling or exceeding 75 to 80 per cent based on the quantity of aldehyde used can be produced with an average retention time in each chlorinator of three and a third to four days.

The following examples further illustrate the operation of the process.

*Example 1*

Into an operating chlorinating system for the production of chloral, such as that illustrated in the diagrammatic representation, chlorine and paraldehyde are fed in a mol ratio of about 9 to 1. The chlorine is divided such that from about 5 to 10 per cent is introduced into the second chlorinator. The mixtures in the chlorinator are maintained at a temperature of about 82° C. Antimony trichloride at the rate of about 2.5 parts per 100 parts of paraldehyde is added to the first chlorinator. The partially chlorinated mixture from the first chlorinator and intermixed antimony trichloride are withdrawn into the second chlorinator so as to maintain the volume in the first chlorinator substantially constant. The feed rates are such that the average time of retention of the material in the chlorinators is of the order of three to four days. The dichloroacetaldehyde can be reduced to a very low percentage, say, of the order of 1 to 2 per cent of the chloral, dependent upon the average time of retention in the chlorinators.

By operating in accordance with this system, the amount of butyl chloral and other high boiling fractions can also be reduced to a very low percentage, say, of the order of several per cent. The yield of chloral from the system is of the order of 70 to 80 per cent or more based upon the amount of aldehyde used. The conversion of the aldehyde to the chlorinated aldehyde is substantially complete. The yield of chloral is less than that theoretically possible primarily due to the fact that a certain amount of the aldehyde and chlorinated aldehydes escapes with the gaseous by-products. Additionally, it is difficult to completely separate the chloral from the high boiling by-products. Thus it can be said that the yield is substantially quantitative when considered apart from the inefficiencies inherent in the apparatus.

*Example 2*

Chlorine and paraldehyde are fed in a mol ratio of about 9 to 1 into a chlorination vessel initially filled with chloroacetaldehydes consisting primarily of chloral and maintained at a temperature of 85° C. Antimony trichloride at the rate of 2.3 grams per 100 grams of paraldehyde is also added. The product is withdrawn continuously to maintain a constant volume in the reactor. The feed rates are such that the average time of retention of the material in the chlorinator is 273 hours. The chloral and dichloroacetaldehyde in the product under certain circumstances represent 59 per cent and 4 per cent, respectively, of the original aldehyde. When such yields are obtained, only 2 per cent of the paraldehyde is converted to butyl chloral and approximately 3 per cent to acetic acid.

By more careful controls and regulation of the period of retention, the procedures of this example may be used to produce typical yields of 75 per cent of chloral and 1 per cent of dichloroacetaldehyde.

Example 3

Upon repeating the chlorination described in Example 2 with a retention time of sixty-eight hours, the chloral and dichloroacetaldehyde in the reaction product typically represent 70 per cent and 6 per cent, respectively, of the original paraldehyde, although yields as low as 59 per cent and 15 per cent, respectively, are at times obtained.

Example 4

The operations described in Example 2 were repeated with a second chlorinator in series with the first. The chlorine feed was divided between the two, the greater part going to the first chlorinator. Customarily from 5 to 10 per cent of chlorine is introduced into the second reactor. The retention time in each chlorinator was sixty-eight hours. The chloral and dichloroacetaldehyde in the product represent 73 per cent and 0.6 per cent, respectively, of the original paraldehyde.

In the illustrative embodiments of the examples where the aldehyde is converted into chloroacetaldehyde in one reactor and the chlorinated acetaldehyde more highly chlorinated in a succeeding reactor, the first stage of the chlorination could be eliminated by procuring chloroacetaldehydes from other sources, such as monochloroacetaldehyde produced from vinyl chloride and hypochlorous acid. When the second stage above is used, diluents are unnecessary, since the chloroacetaldehydes apparently undergo undesired side reactions, such as oxidation to acetic acid or condensation reactions, much less readily than the unchlorinated aldehyde.

The preferred diluent used in our process is the chlorination product of the acetaldehyde or its reversible polymer. In using such diluents, problems of refining the crude product and separating undesired products are significantly reduced. When using chlorinated aldehydes as the diluent and introducing the chlorine and aldehyde in a ratio sufficient to convert the aldehyde to chloroacetaldehyde, the concentration of the aldehyde present in the reaction mass is always maintained as low as found necessary or desirable, and conditions found conducive to the formation of the desired chlorination products are maintained and the formation of undesired by-products seemingly inhibited. Other liquid diluents which are miscible with the aldehyde or its chlorination product may be used, however, such as acetic acid, organic solvents such as carbon tetrachloride, inorganic material such as water, and the like. When diluents other than the products of the chlorination are used, it is often difficult to separate them from the reaction mass, particularly when water is used; and, as a result, anhydrous diluents are preferred, such as certain organic liquids.

It will be understood that acetaldehyde and its reversible polymers encompass monomeric acetaldehyde having the formula $CH_3CHO$ and those polymers having the formula $(CH_3CHO)_n$ which may be made reversibly from it, such as paraldehyde, metaldehyde, and the like. When metaldehyde is used in the process, it is preferably used in a liquid medium.

This application is a continuation-in-part of our application Serial No. 745,726, filed May 3, 1947.

The foregoing description constituting illustrative embodiments of the invention is not to be considered a limitation upon the invention, for the invention contemplates various adaptations, alterations, and modifications within the scope of the invention which is defined by the appended claims.

We claim:

1. In a process for the chlorination of a substance selected from the group consisting of acetaldehyde and its reversible polymers, the steps which comprise continuously adding said substance to a body of at least 3.5 mols of chloroacetaldehyde per mol equivalent of acetaldehyde, continuously adding more than enough chlorine to said body to convert the added substance to monochloroacetaldehyde but less than enough chlorine to convert said substance to chloral, and chlorinating said substance in said body at temperatures of at least 50° C. in the presence of a reaction promoter, continuously withdrawing the chlorinated substance from said body and continuously adding chlorine to the withdrawn substance and further chlorinating the withdrawn substance at temperature in excess of 50° C.

2. In a continuous process for the chlorination of a substance selected from the group consisting of acetaldehyde and its reversible polymers the steps comprising continuously feeding said substance into a reactor which contains a chloroacetaldehyde in a quantity equaling at least 3.5 to 4.0 mols of chloroacetaldehyde per mol of added substance expressed as mol equivalents of acetaldehyde, continuously introducing chlorine into said reactor in a quantity greater than one half the quantity necessary to convert said substance into chloral but less than enough chlorine to convert said substance to chloral and effectuating chlorination therein at temperatures of at least 50° C., continuously withdrawing some of the product from said reactor including dichloroacetaldehyde, and continuously converting the withdrawn product to chloral in the presence of a reaction promoter by continuously introducing chlorine into the withdrawn product at temperatures in excess of 50° C. until substantially all of the dichloroacetaldehyde is converted to chloral.

3. In a continuous process for the chlorination of a substance selected from the group consisting of acetaldehyde and its reversible polymers the steps comprising continuously feeding said substance into a reactor which contains a chloroacetaldehyde in a quantity equaling at least 3.5 to 4.0 mols of chloroacetaldehyde per mol of added substance expressed as mol equivalents of acetaldehyde, continuously introducing chlorine into said reactor in a quantity greater than one half the quantity necessary to convert said substance into chloral and effectuating chlorination therein at temperatures of at least 50° C., continuously withdrawing some of the product from said reactor, and continuously converting the withdrawn product to chloral at temperatures of at least 50° C. by continuously introducing chlorine into the withdrawn product in the presence of a chlorination catalyst selected from the group consisting of the chlorides of iron, zinc, tin, antimony and phosphorus until the total amount of chlorine introduced substantially equals but does not substantially exceed the amount necessary to convert the added substance to chloral.

4. A continuous multistage process for producing chloral from a substance selected from the group consisting of acetaldehyde and its reversible polymers comprising continuously adding said substance and chlorine to one stage of a reaction system and mixing said substance and chlorine therein with a reaction-promoter selected from the group consisting of the chlorides of iron, zinc, antimony, tin and phosphorus and an amount of a non-aqueous liquid diluent inert to said substance and its chlorination products sufficient to substantially prevent deleterious side reactions at the temperatures used, chlorinating said substance in said stage of the reaction system until it is converted to a chlorinated acetaldehyde, continuously withdrawing said chlorinated substance and reaction-promoter, and introducing them into another stage of the reaction system, introducing chlorine in said other stage, and continuing the chlorination of said chlorinated aldehyde in said other stage until a major portion of said chlorinated aldehyde is converted into chloral, the chlorination taking place substantially throughout said stages at temperatures in excess of 50° C.

JOHN A. PIANFETTI.
DAVID J. PORTER.

REFERENCES CITED

The following references are of record in the file of this patent:

UNITED STATES PATENTS

| Number | Name | Date |
|---|---|---|
| 2,443,183 | Cass | June 15, 1948 |
| 2,478,741 | Brothman | Aug. 9, 1949 |
| 2,552,934 | Cave et al. | May 15, 1951 |

FOREIGN PATENTS

| Number | Country | Date |
|---|---|---|
| 576,805 | Great Britain | Apr. 18, 1946 |
| 581,431 | Great Britain | Oct. 11, 1946 |

OTHER REFERENCES

Wurtz et al.: Compt. Rend. 74, pp. 777–84 (1872).

Pinner: "Liebig's Annalen," vol. 179–180, pp. 24, 25 (1875).

Kiss et al.: Chemical Abstracts, vol. 35, p. 2059 (1941).

Callaham: Chem. and Met. Eng., Oct. 1944, pp. 109–14.

Schulz: P. B. Report 70309 July 18, 1947, Frame No. 8241.

Shchukina: Chem. Abstracts, vol. 43, p. 2575 (Apr. 1949).